(12) United States Patent
Kang

(10) Patent No.: US 7,869,389 B2
(45) Date of Patent: Jan. 11, 2011

(54) NETWORK DEVICE WITH PROXY ADDRESS RESOLUTION PROTOCOL

(75) Inventor: Baogang Kang, Chengdu (CN)

(73) Assignee: O2Micro, Inc., Santa Clara, CA (US)

( * ) Notice: Subject to any disclaimer, the term of this patent is extended or adjusted under 35 U.S.C. 154(b) by 141 days.

(21) Appl. No.: 12/286,027

(22) Filed: Sep. 26, 2008

(65) Prior Publication Data

US 2010/0080227 A1    Apr. 1, 2010

(51) Int. Cl.
*H04J 1/16* (2006.01)
*H04L 12/56* (2006.01)

(52) U.S. Cl. .................. 370/278; 370/252; 370/282; 370/389; 370/419

(58) Field of Classification Search ........... 370/252, 370/278, 282, 389, 419
See application file for complete search history.

(56) References Cited

U.S. PATENT DOCUMENTS

| | | | |
|---|---|---|---|
| 6,603,769 B1 * | 8/2003 | Thubert et al. | 370/401 |
| 2002/0112076 A1 * | 8/2002 | Rueda et al. | 709/245 |

* cited by examiner

*Primary Examiner*—John Pezzlo

(57) ABSTRACT

A network device includes a proxy ARP (address resolution protocol) unit for comparing a target IP (Internet protocol) address contained in an ARP request frame with a first set of IP addresses in a proxy ARP table of the proxy ARP unit, and for generating an ARP reply frame containing a MAC (media access control) address of the network device according to a result of the comparison. In addition, the network device includes a routing table for storing a second set of IP addresses for IP packet routing. Furthermore, the network device includes a processing unit coupled between the proxy ARP unit and the routing table. The processing unit is operable for receiving the ARP request frame, assigning an IP address to a host logging onto the network device, and updating the assigned IP address into the proxy ARP table and the routing table respectively.

25 Claims, 3 Drawing Sheets

NETWORK DEVICE WITH PROXY ADDRESS RESOLUTION PROTOCOL

TECHNICAL FIELD

Embodiments in accordance with the present invention relate to network devices with proxy address resolution protocol.

BACKGROUND ART

In a conventional Ethernet environment, in order to enable data communication (e.g., TCP/IP data communication) between a sender device and a target device, the DLL (data link layer) communication is established first, e.g., the sender device obtains a MAC (media address control) address of the target device according to an IP (Internet protocol) address of the target device by using the ARP (address resolution protocol). More specifically, according to the ARP, the sender device can broadcast an ARP request frame containing a target IP address on an Ethernet, and all the other network devices attached to the Ethernet can receive the request frame. But only the network device having the target IP address will respond to the ARP request with its own MAC address.

If the target device is attached to a different Ethernet from the sender device, and is assigned an IP address containing the same network ID with the sender device so as to be included in the same virtual private network with the sender device, an ARP Proxy may need to be established between the sender and target devices. For example, a proxy ARP can be configured in a gateway between the sender and target devices. More specifically, the gateway can receive an ARP request frame broadcasted by the sender device, and compare the target IP address contained in the ARP request frame with a set of IP addresses in the routing table of the gateway. If the IP address of the target device is included in the routing table, which means the target device can be reachable from the gateway, the gateway can respond to the sender device with its own MAC address to enable the DLL communication between the sender device and the gateway. As such, the gateway can receive IP packet from the sender device and then transfer the IP packet to the target device, such that the data communication between the sender and target devices can be established.

However, the conventional proxy ARP technique may cause some proxy ARP errors. For example, a sender host, a target host and a gateway having the proxy ARP function can be attached to the same Ethernet. The sender host can broadcast an ARP request frame containing the IP address of the target host. After receiving the ARP request frame, the target host can respond to the sender host with its own MAC address. However, IP address of the target host may be included in the routing table of the gateway, such that the gateway can also respond to the sender host with its own MAC address after receiving the ARP request frame. As a result, the latest MAC address received by the sender host may not be the MAC address of the target host, which may cause a proxy ARP error. In other words, the gateway may block the proper DDL communication. In addition, a change of the configuration of the routing table may also cause a proxy ARP error.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

SUMMARY

Figure 1:
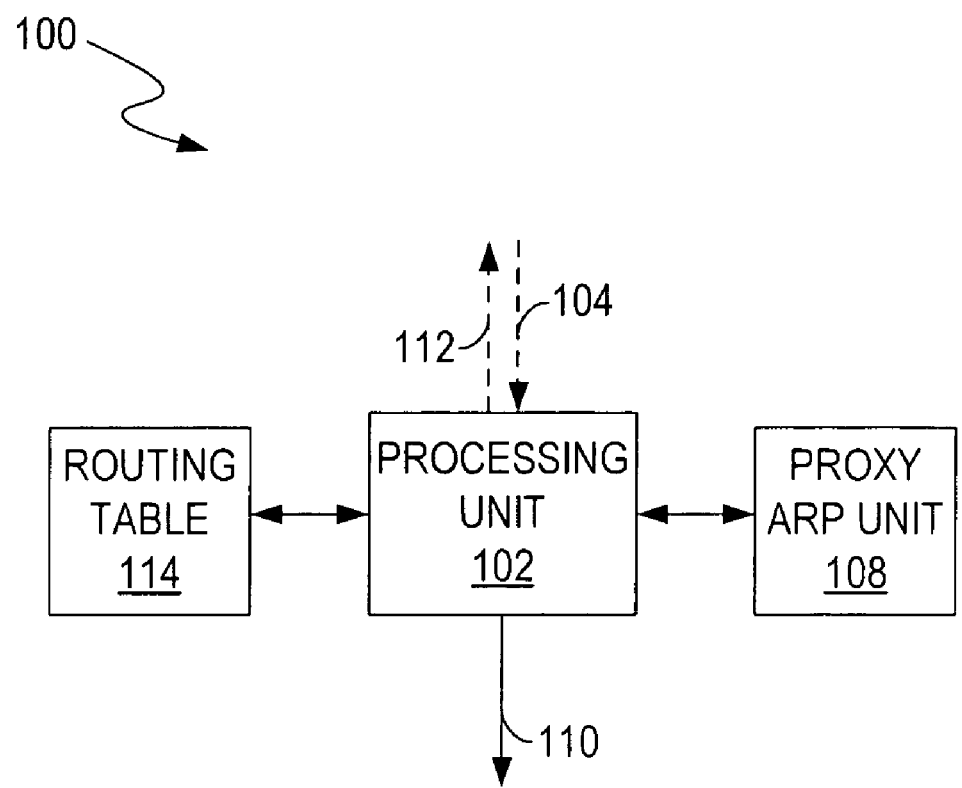
FIG. 1 illustrates an exemplary block diagram of a network device, in accordance with one embodiment of the present invention.

In one embodiment, a network device includes a proxy ARP unit for comparing a target IP address contained in an ARP request frame with a first plurality of IP addresses in a proxy ARP table of the proxy ARP unit, and for generating an ARP reply frame containing a MAC address of the network device according to a result of the comparison. In addition, the network device includes a routing table for storing a second plurality of IP addresses for IP packet routing. Furthermore, the network device includes a processing unit coupled between the proxy ARP unit and the routing table. The processing unit is operable for receiving the ARP request frame, assigning an IP address to a host logging onto the network device, and updating the assigned IP address into the proxy ARP table and the routing table respectively.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, the present invention provides a network device (e.g., a gateway) which can operate/function as an ARP (address resolution protocol) Proxy to enable data communication between a sender device and an outside target device that is attached to a different Ethernet from the sender device. Advantageously, in one embodiment, when the sender device broadcasts an ARP request frame containing an IP address of a local target device that is attached to the same Ethernet with the sender device, the network device can avoid/reduce proxy ARP error, and DDL (data link layer) communication between the sender device and the local target device can be established properly.

FIG. 1 illustrates an exemplary block diagram of a network device 100, in accordance with one embodiment of the present invention. As shown in FIG. 1, the network device 100 (e.g., a gateway) includes a proxy ARP unit 108, a routing table 114, and a processing unit 102 coupled between the proxy ARP unit 108 and the routing table 114.

The proxy ARP unit 108 can be operable for comparing a target IP address contained in an ARP request frame 104 with a first plurality of IP addresses in a proxy ARP table of the proxy ARP unit 108, and for generating an ARP reply frame 112 containing a MAC address of the network device 100 according to a result of the comparison. The routing table 114 can be used for storing a second plurality of IP addresses for IP packet routing. The processing unit 102 coupled between the proxy ARP unit 108 and the routing table 114 can be operable for receiving the ARP request frame 104, and for assigning an IP address 110 to a host (not shown in FIG. 1) logging onto the network device 100, and for updating the assigned IP address 110 into the proxy ARP table and the routing table 114 respectively.

More specifically, in one embodiment, if a host logs onto the network device 100, the processing unit 102 can assign an IP address 110 to the host and update the assigned IP address 110 into the first plurality of IP addresses in the proxy ARP table of the proxy ARP unit 108. Thus, each IP address of the first plurality of IP addresses can indicate an identification of a corresponding host logging onto the network device 100. Furthermore, the proxy ARP table contains IP addresses only assigned to corresponding hosts logging onto the network device 100, in one embodiment. Advantageously, the processing unit 102 can not only update an assigned IP address 110 into the proxy ARP table when a corresponding host logs onto the network device 100, but can also delete the assigned IP address 110 from the proxy ARP table when the corresponding host logs off or is disconnected from the network device 100.

In one embodiment, each IP address of the first plurality of IP addresses in the proxy ARP unit 108 contains a network ID of an Ethernet (not shown in FIG. 1) coupled to the network device 100. Since the first plurality of IP addresses are respectively assigned to a plurality of hosts logging onto the network device 100, the plurality of hosts and the network device 100 can be included in the same virtual private network.

In one embodiment, the second plurality of IP addresses stored in the routing table 114 can be used for IP packet routing. For example, if a target host (not shown in FIG. 1) has an IP address included in the routing table 114, the network device 100 can receive an IP packet from a sender host (not shown in FIG. 1) and forward the IP packet to the target host via a network interface of the network device 100. The routing table 114 can determine which network interface of the network device 100 can be used for the IP packet routing. In one embodiment, the IP address 110 that is assigned to the host logging onto the network device 100 can also be updated into the routing table 114 for IP packet routing.

In operation, when the network device 100 receives the ARP request frame 104 from the sender host, the proxy ARP unit 108 can receive the ARP request frame 104 via the processing unit 102 and compare the target IP address contained in the ARP request frame 104 with the first plurality of IP addresses in the proxy ARP table, in one embodiment. The proxy ARP unit 108 can drop the ARP request frame 104 when the target IP address is not matched with any IP address in the proxy ARP table. On the other hand, the proxy ARP unit 108 can generate the ARP reply frame 112 when the target IP address is matched with one IP address of the first plurality of IP addresses in the proxy ARP table, and transfer the ARP reply 112 to the sender host via the processing unit 102.

In other words, if a host has an IP address that is contained in the proxy ARP table, the network device 100 can operate as an ARP Proxy for the host. If the network device 100 receives an ARP request frame 104 containing a target IP address that is the IP address of the host, the network device 100 can generate the ARP reply frame 112 including the MAC address of the network device 100 to the sender host. As such, the DLL (data link layer) communication between the network device 100 and the sender host can be set up. In one embodiment, after the DLL communication is set up, the network device 100 can receive an IP packet from the sender host and forward the IP packet to the target host according to the routing table 114.

Advantageously, a proxy ARP function based on the routing table 114 can be disabled, and the network device 100 can operate as the ARP Proxy according to the Proxy ARP table in the Proxy ARP unit 108, such that the proxy ARP errors caused by conventional methods can be avoided, in one embodiment. For example, if the network device 100 receives an ARP request frame containing a target IP address that is included in the routing table 114, but is not included in the Proxy ARP table in the proxy ARP unit 108, the network device 100 will not respond to the ARP request frame.

Figure 2:
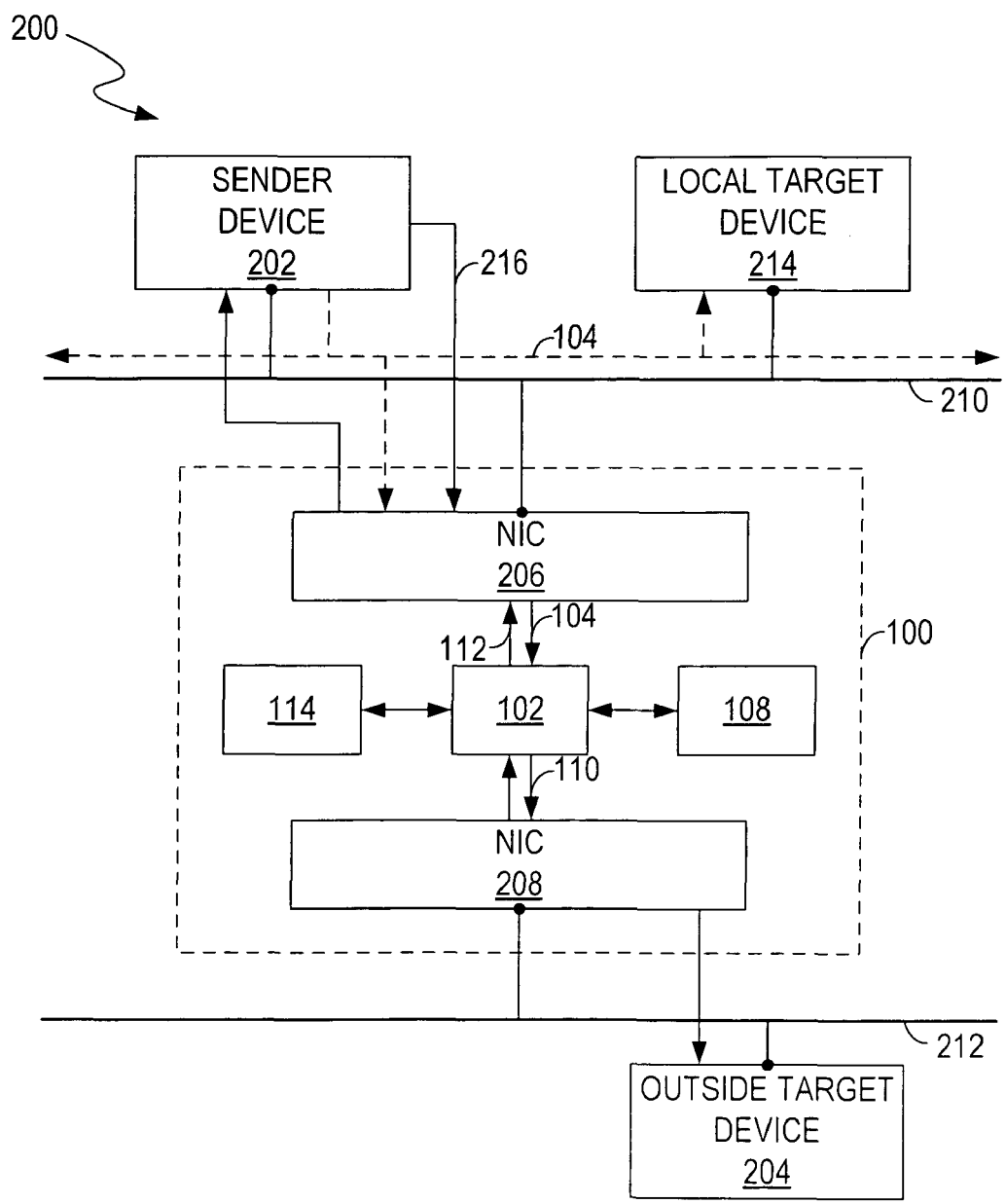
FIG. 2 illustrates an exemplary block diagram of a network system, in accordance with one embodiment of the present invention.

FIG. 2 illustrates an exemplary block diagram of a network system 200, in accordance with one embodiment of the present invention. Elements that are labeled the same as in FIG. 1 have similar functions and will not be repetitively described herein. In one embodiment, the network system 200 includes a sender device 202 for broadcasting an ARP request frame 104, and the network device 100 coupled to the sender device 202 for enabling data communication between the sender device 202 and an outside target device 204 logging onto the network device 100. In one embodiment, the outside target device 204 and the sender device 202 can be attached to mutually different Ethernets.

In one embodiment, the network device 100 can be a gateway which has an NIC (network interface card) 206 coupled to an Ethernet 210 having a network ID $NID_{210}$. As shown in FIG. 2, the sender device 202 can be attached to the Ethernet 210, and assigned an IP address containing the network ID $NID_{210}$, so as to be included in a virtual private network having the network ID $NID_{210}$.

In one embodiment, the gateway 100 further includes an NIC 208 coupled to an Ethernet 212 having a network ID $NID_{212}$. In one embodiment, the outside target device 204 can be attached to the Ethernet 212, and assigned an IP address containing the network ID $NID_{212}$. In order to be included in the virtual private network having the network ID $NID_{210}$, the outside target device 204 can log onto the gateway 100, and can be assigned another IP address 110 containing the network ID $NID_{210}$ by the gateway 100. The gateway 100 can update the assigned IP address 110 into the proxy ARP table of the proxy ARP unit 108. Additionally, the assigned IP address 110 can be updated into the routing table 114 of the gateway 100 for IP packet routing. The outside target device 204 can have one or more IP addresses.

In another embodiment, the outside target device 204 can also be coupled to the Ethernet 212 via one or more network devices (not shown in FIG. 2). In order to be included in the virtual private network having the network ID $NID_{210}$, the outside target device 204 can remotely log onto the gateway 100. Similarly, the gateway 100 can assign an IP address 110 containing the network ID $NID_{210}$ to the outside target device 204, and update the assigned IP address 110 into the proxy ARP table and the routing table 114.

In order to communicate with the outside target device 204, the sender device 202 can broadcast an ARP request frame 104 on the Ethernet 210. In one embodiment, the processing unit 102 can receive the ARP request frame 104 via the NIC 206 and transfer the ARP request frame 104 to the proxy ARP unit 108. The proxy ARP unit 108 can extract the target IP address from the ARP request frame 104 and compare the target IP address with the first plurality of IP addresses in the proxy ARP table.

In one embodiment, the gateway 100 can drop the ARP request frame 104 when the target IP address is not matched with any IP address of the first plurality of IP addresses. For example, if the target IP address is different from any IP address in the proxy ARP table, the proxy ARP unit 108 can drop the ARP request frame 104.

In one embodiment, the gateway 100 can generate the ARP reply frame 112 when the target IP address is matched with one IP address of the first plurality of IP addresses, and transmit the ARP reply frame 112 to the sender device 202. For example, if the target IP address is the same as one IP address in the proxy ARP table, the proxy ARP unit 108 can generate the ARP reply frame 112, and transfer the ARP reply frame 112 to the processing unit 102. The processing unit 102 can transmit the ARP reply frame 112 containing the MAC address of the gateway 100 to the sender device 202 via the NIC 206. Thus, the DLL communication between the sender device 202 and the gateway 100 can be established. As such, the gateway 100 can receive an IP packet 216 from the sender device 202 and forward the IP packet 216 to the outside target device 204 according to the routing table 114. MAC address is a hardware address that is burnt into a ROM chip on an NIC when the NIC is manufactured. In one embodiment, the MAC address of the gateway 100 can be the hardware address burnt into a ROM chip on the NIC 206.

In one embodiment, the network system 200 further includes a local target device 214 attached to the same Ethernet 210 with the sender device 202. In one embodiment, the local target device 214 can also receive the ARP request frame 104, and compare the target IP address with an IP address of the local target device 214. The local target device 214 can generate an ARP reply frame containing the MAC address of the local target device 214 according to a result of the comparison between the target IP address and the IP address of the local target device 214. If the target IP address is the same with the IP address of the local target device 214, the local target device 214 can generate the ARP reply frame containing the MAC address of the local target device 214 for responding to the sender device 202. If the target IP address is different from the IP address of the local target device 214, the local target device 214 can drop the received ARP request frame 104.

Advantageously, in one embodiment, the proxy ARP table of the gateway 100 includes the IP addresses which are only assigned to the corresponding outside network devices logging onto the gateway 100, such that the DLL communication between the sender device 202 and the local target device 214 will not be blocked by the gateway 100. More specifically, the IP address of the local target device 214 is not included in the proxy ARP table. As such, if the sender device 202 broadcasts an ARP request frame 104 containing the IP address of the local target device 214, the gateway 100 will not respond to the ARP request frame 104 with the MAC address of the gateway 100. As a result, the sender device 202 can receive a correct ARP reply frame from the local target device 214, and the data communication between the sender and the local target devices 214 can be established properly.

Figure 3:
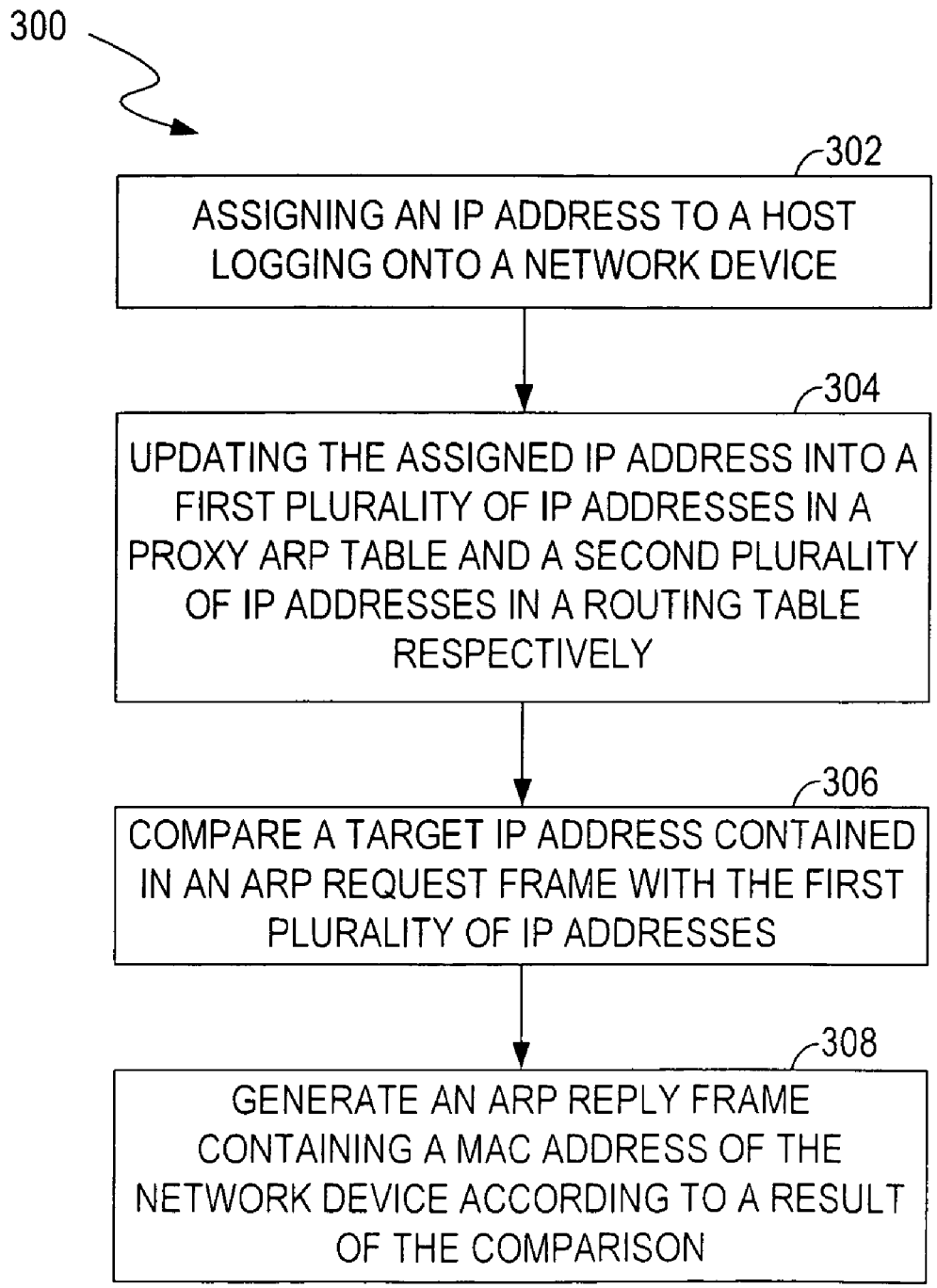
FIG. 3 illustrates an exemplary flowchart of operations performed by a network device, in accordance with one embodiment of the present invention.

FIG. 3 illustrates an exemplary flowchart 300 of operations performed by a network device which is operable for enabling data communication, in accordance with one embodiment of the present invention. FIG. 3 is described in combination with FIG. 1 and FIG. 2. The flowchart 300 can be implemented as computer-executable instructions stored in a computer-readable medium.

In block 302, the network device 100 can assign an IP address to a host logging onto the network device 100. More specifically, if a host (e.g., the outside target device 204) logs onto the network device 100, the processing unit 102 can assign an IP address 110 containing the network ID $NID_{210}$ of the Ethernet 210 coupled to the network device 100 to the host 204, in one embodiment.

In block 304, the network device 100 can update the assigned IP address 110 into a first plurality of IP addresses in a proxy ARP table and a second plurality of IP addresses in a routing table respectively. In one embodiment, the processing unit 102 can not only update the assigned IP address 110 into the proxy ARP table when the corresponding host logs onto the network device 100, but can also delete the assigned IP address 110 from the proxy ARP table when the corresponding host logs off or is disconnected from the network device 100. As such, in one embodiment, the proxy ARP table can contain IP addresses only assigned to corresponding hosts logging onto said network device, so as to avoid proxy ARP errors.

In block 306, the network device 100 can compare a target IP address contained in an ARP request frame 104 with the first plurality of IP addresses. More specifically, when the network device 100 receives the ARP request frame 104, the proxy ARP unit 108 can extract the target IP address from the ARP request frame 104 and compare the target IP address with the first plurality of IP addresses in the proxy ARP unit 108. In block 308, the network device 100 can generate an ARP reply frame 112 containing the MAC address of the network device 100 according to a result of the comparison.

Accordingly, in one embodiment, the present invention provides a network device for enabling data communication between a sender device and an outside target device. The outside target device can be attached to a different Ethernet from the sender device but have an IP address containing the same network ID of the sender device. The sender device can broadcast an ARP request frame containing the IP address of the outside target device. The network device can receive the ARP request frame broadcasted by the sender device, and respond to the sender device with its own MAC address if the IP address of the outside target device is included in the proxy ARP table of the network device. As such, the sender device can communicate with the outside target device properly. The sender device may also broadcast an ARP request frame containing an IP address of a local target device that is attached to the same Ethernet with the sender device. Since the IP address of the local target device is not included in the proxy ARP table, the network device will not respond to the sender device, and the DLL communication between the sender device and the local target device can be established properly.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A network device comprising:
   a proxy ARP (address resolution protocol) unit for comparing a target IP (Internet protocol) address contained in an ARP request frame with a first plurality of IP addresses in a proxy ARP table of said proxy ARP unit, and for generating an ARP reply frame containing a MAC (media access control) address of said network device according to a result of said comparison;
   a routing table for storing a second plurality of IP addresses for IP packet routing; and
   a processing unit coupled between said proxy ARP unit and said routing table, and for receiving said ARP request frame, and for assigning an IP address to a host logging onto said network device, and for updating said assigned IP address into said proxy ARP table and said routing table respectively.

2. The network device as claimed in claim 1, wherein each IP address of said first plurality of IP addresses indicates an identification of a corresponding host logging onto said network device.

3. The network device as claimed in claim 1, wherein said proxy ARP table contains IP addresses only assigned to corresponding hosts logging onto said network device.

4. The network device as claimed in claim 1, wherein each IP address of said first plurality of IP addresses comprises a network ID of an Ethernet coupled to said network device.

5. The network device as claimed in claim 1, wherein said proxy ARP unit receives said ARP request frame via said processing unit.

6. The network device as claimed in claim 1, wherein said proxy ARP unit drops said ARP request frame when said target IP address is not matched with any IP address in said proxy ARP table.

7. The network device as claimed in claim 1, wherein said proxy ARP unit generates said ARP reply frame when said target IP address is matched with one IP address of said first plurality of IP addresses, and wherein said proxy ARP unit transfers said ARP reply frame to said processing unit for responding to said ARP request frame.

8. The network device as claimed in claim 1, wherein a proxy ARP function based on said routing table is disabled.

9. A computer-implemented method for enabling data communication, comprising:
   assigning an IP address to a host logging onto a network device;
   updating said assigned IP address into a first plurality of IP addresses in a proxy ARP (address resolution protocol) table and a second plurality of IP addresses in a routing table respectively;
   comparing a target IP address contained in an ARP request frame with said first plurality of IP addresses;
   generating an ARP reply frame containing a MAC (media access control) address of said network device according to a result of said comparison.

10. The computer-implemented method as claimed in claim 9, wherein each IP address of said first plurality of IP addresses indicates a corresponding host logging onto said network device.

11. The computer-implemented method as claimed in claim 9, wherein said proxy ARP table contains IP addresses only assigned to corresponding hosts logging onto said network device.

12. The computer-implemented method as claimed in claim 9, wherein each IP address of said first plurality of IP addresses comprises a network ID of an Ethernet coupled to said network device.

13. The computer-implemented method as claimed in claim 9, further comprising:
   generating said ARP reply frame when said target IP address is matched with one IP address of said first plurality of IP addresses.

14. The computer-implemented method as claimed in claim 9, further comprising:
   dropping said ARP request frame when said target IP address is not matched with any IP address in said proxy ARP table.

15. The computer-implemented method as claimed in claim 9, further comprising:
   disabling a proxy ARP function based on said routing table.

16. A network system comprising:
   a sender device for broadcasting an ARP (address resolution protocol) request frame; and
   a network device coupled to said sender device for enabling data communication between said sender device and an outside target device logging onto said network device, said network device comprising:
      a proxy ARP unit for comparing a target IP address contained in said ARP request frame with a first plurality of IP addresses in a proxy ARP table of said proxy ARP unit, and for generating an ARP reply frame containing a MAC (media access control) address of said network device according to a result of said comparison;
      a routing table for storing a second plurality of IP addresses for IP packet routing; and a processing unit coupled between said proxy ARP unit and said routing table, and for receiving said ARP request frame, and for assigning an IP address to said outside target device, and for updating said assigned IP address into said proxy ARP table and said routing table respectively.

17. The network system as claimed in claim 16, wherein each IP address of said first plurality of IP addresses indicates an identification of a corresponding host logging onto said network device.

18. The network system as claimed in claim 16, wherein said proxy ARP table contains IP addresses only assigned to corresponding hosts logging onto said network device.

19. The network system as claimed in claim 16, wherein each IP address of said first plurality of IP addresses comprises a network ID of an Ethernet coupled to said network device.

20. The network system as claimed in claim 16, wherein said proxy ARP unit receives said ARP request frame via said processing unit.

21. The network system as claimed in claim 16, wherein said proxy ARP unit drops said ARP request frame when said target IP address is not matched with any IP address of said plurality of IP addresses.

22. The network system as claimed in claim 16, wherein said proxy ARP unit generates said ARP reply frame when said target IP address is matched with one IP address of said plurality of IP addresses, and wherein said proxy APR unit transfers said ARP reply frame to said processing unit for responding to said ARP request frame.

23. The network system as claimed in claim 16, wherein a proxy ARP function based on said routing table is disabled.

24. The network system as claimed in claim 16, further comprising:

a local target device attached to the same Ethernet with said sender device and for receiving said ARP request frame, and for comparing said target IP address with an IP address of said local target device, and for generating an ARP reply frame containing a MAC address of said local target device according to a result of said comparison between said target IP address and said IP address of said local target device.

25. The network system as claimed in claim 16, wherein said outside target device and said sender device are attached to mutually different Ethernets.

\* \* \* \* \*